US012412462B2

(12) United States Patent
Zhou et al.

(10) Patent No.: US 12,412,462 B2
(45) Date of Patent: Sep. 9, 2025

(54) ELECTRONIC ANTI-THEFT LABEL OF NICKEL-TITANIUM ALLOY TEMPERATURE MEMORY WIRE

(71) Applicant: XUZHOU DRAGON GUARD INDUSTRIAL CO., LTD, Xuzhou (CN)

(72) Inventors: Wen Zhou, Xuzhou (CN); Bin Zhao, Xuzhou (CN); Lin Xin, Xuzhou (CN); Shanshan Xu, Xuzhou (CN)

(73) Assignee: XUZHOU DRAGON GUARD INDUSTRIAL CO., LTD, Xuzhou (CN)

( * ) Notice: Subject to any disclaimer, the term of this patent is extended or adjusted under 35 U.S.C. 154(b) by 66 days.

(21) Appl. No.: 18/617,654

(22) Filed: Mar. 27, 2024

(65) Prior Publication Data

US 2025/0087071 A1 Mar. 13, 2025

(30) Foreign Application Priority Data

Sep. 8, 2023 (CN) ......................... 202311161066.4

(51) Int. Cl.
*G08B 13/24* (2006.01)

(52) U.S. Cl.
CPC ................................ *G08B 13/2431* (2013.01)

(58) Field of Classification Search
CPC ............. G08B 13/2431; E05B 73/0029; E05B 73/005; E05B 73/0017; E05B 39/00; G09F 3/03; G09F 3/0305
See application file for complete search history.

(56) References Cited

U.S. PATENT DOCUMENTS 6,306,240 B1 10/2001 Permingeat et al.
6,342,837 B1 1/2002 Lai et al.
10,621,484 B2 4/2020 Lazarev
2015/0013398 A1* 1/2015 Taylor ................. E05B 47/0001 70/20
2020/0265692 A1* 8/2020 Van Landingham, Jr. .................. G08B 13/2434
2023/0243190 A1* 8/2023 Müller .................... E05B 67/28 340/568.1

* cited by examiner

*Primary Examiner* — Christine M Mills
*Assistant Examiner* — Christopher F Callahan
(74) *Attorney, Agent, or Firm* — True Shepherd LLC; Andrew C. Cheng

(57) ABSTRACT

An electronic anti-theft label of a nickel-titanium alloy temperature memory wire includes a first housing, a second housing with a boss, a locking beam, a locking catch, a rotating device, a nickel-titanium alloy temperature memory wire, and an unlocking device. The second coil on the unlocking device generates, after being energized, a magnetic field around. The second coil serving as a sending end is placed in a third groove, so that the first coil is induced to generate electricity by using the electromagnetic induction principle, and the first coil serves as a receiving end. The sending end sends an electromagnetic signal to the external environment under the action of electric power, and the receiving end receives the electromagnetic signal and converts the electromagnetic signal into current. The nickel-titanium alloy temperature memory wire is energized and heated to contract to drive the rotating device to move.

8 Claims, 8 Drawing Sheets

ELECTRONIC ANTI-THEFT LABEL OF NICKEL-TITANIUM ALLOY TEMPERATURE MEMORY WIRE

CROSS-REFERENCE TO RELATED APPLICATIONS

This application claims priority to Chinese Patent Application No. 202311161066.4, with a filing date of Sep. 8, 2023. The content of the aforementioned application, including any intervening amendments thereto, is incorporated herein by reference.

FIELD

The present disclosure relates to the technical field of electronic anti-theft labels, and in particular to an electronic anti-theft label of a nickel-titanium alloy temperature memory wire.

BACKGROUND

At present, open shopping is used by most shopping malls and supermarkets. In order to prevent goods from being stolen, anti-theft buckles that are difficult to remove are attached onto the goods, and most are electronic anti-theft labels. The electronic anti-theft label can only be opened by an unlocking device at a cashier desk. Once someone wants to take the goods with the electronic anti-theft label out of the shopping mall, a detection door will issue an alarm signal when the person passes through the anti-theft detection door at an exit, thus effectively preventing the goods from being stolen. With the development of social economy, the use scope of electronic anti-theft labels is getting wider and wider, which saves a lot of labor costs for businesses.

At present, the anti-theft lock of shopping malls and supermarkets is basically unlocked by magnetic force of magnet, and the magnet is made of neodymium iron boron, which is relatively heavy in weight and high in price. In addition, the unlocking device with strong magnetic force has certain dangers, such as easily attracting iron products by mistake and possibly causing harm to people by pinching hand. In addition, the internal processing technology of the existing electronic anti-theft label is complicated, so that the production speed is slow, the labor cost is high and the production efficiency is low. At the same time, a lot of material is wasted, and there are problems such as high production cost and troublesome mounting.

SUMMARY

In view of this, an electronic anti-theft label of a nickel-titanium alloy temperature memory wire is provided according to the present disclosure, so as to solve the problems in the conventional technology.

In order to achieve the above object, the following technical solutions are provided according to the present disclosure.

According to a first aspect of the present disclosure, an electronic anti-theft label of a nickel-titanium alloy temperature memory wire includes a first housing, a second housing with a boss, a locking beam, a locking catch, a rotating device, a nickel-titanium alloy temperature memory wire, and an unlocking device; where a hollow chamber for accommodating the rotating device is defined by the first housing and the second housing, a first groove and a second groove are defined in the hollow chamber, the first groove and the second groove are in communication with the hollow chamber; two ends of the locking beam are arranged in the first groove and the second groove respectively; the locking catch is arranged in the hollow chamber and is connected with an end of the locking beam in the first groove, and the rotating device is connected with the locking catch; the nickel-titanium alloy temperature memory wire is wound on the boss to form a first coil which abuts against the rotating device; an end of the unlocking device is provided with a second coil made of metal, a third groove is defined on a side, facing away from the first housing, of the boss, the third groove is configured to accommodate the second coil, the second coil is placed in the third groove after the unlocking device is energized, the first coil is induced to generate electricity, and the nickel-titanium alloy temperature memory wire is heated to contract to drive the rotating device to move, so that the locking catch is disengaged from the locking beam.

Further, the rotating device includes a first spring, a second spring and a rotating member, the rotating member is connected with the locking catch, one end of the first spring abuts against an inner wall of the hollow chamber, the other end of the first spring abuts against one end of the rotating member, the other end of the rotating member abuts against one end of the second spring, and the other end of the second spring abuts against the end of the locking beam in the first groove.

Further, the second spring is a conical spring which tapers from top to bottom.

Further, the electronic anti-theft label of the nickel-titanium alloy temperature memory wire further includes a PCB and a buzzer, where the PCB is electrically connected with the nickel-titanium alloy temperature memory wire, the buzzer is electrically connected with the PCB, and the buzzer buzzes when the nickel-titanium alloy temperature memory wire is energized.

Further, the locking beam is U-shaped.

Further, the rotating member is inverted V-shaped.

Further, a locking groove is defined at the end of the locking beam in the first groove, a position-limiting hole is defined in the locking catch, and the locking groove is clamped in the position-limiting hole.

Further, a width of the position-limiting hole gradually decreases from left to right.

The present disclosure has the following advantages. First, the second coil on the unlocking device generates, after being energized, a magnetic field around. The second coil serving as a sending end is placed in the third groove, so that the first coil is induced to generate electricity by using the electromagnetic induction principle, and the first coil serves as a receiving end. The sending end sends an electromagnetic signal to the external environment under the action of electric power, and the receiving end receives the electromagnetic signal and converts the electromagnetic signal into current, which is wireless, and relies on electromagnetic wave propagation to convert electromagnetic wave energy into electric energy. Finally, the first coil transmits wirelessly to generate current. When the current passes through the nickel-titanium alloy temperature memory wire, the nickel-titanium alloy temperature memory wire is energized and heated to contract to drive the rotating device to move by using the property that the shape of the nickel-titanium alloy changes with the change of the temperature, and restores with the restoring of the temperature, so that the locking catch is disengaged from the locking beam, thus achieving the purpose of unlocking.

According to the present disclosure, the electromagnetic induction of the first coil and the second coil and the shape change caused by heating and contraction of the nickel-titanium alloy temperature memory wire after being energized are utilized to drive the rotating device, so as to achieve the purpose of unlocking. Compared with the conventional magnetic anti-theft label, the process of the present disclosure is simpler and lighter, the material cost is reduced, the service life is prolonged and the safety is improved. At the same time, a novel unlocking mode is innovatively proposed.

BRIEF DESCRIPTION OF THE DRAWINGS

In order to illustrate solutions of the embodiments of the present disclosure or in the conventional technology more clearly, the drawings used in the description of the embodiments or conventional technology are briefly described below. It is apparent that the drawings in the following description are only exemplary. For those of ordinary skill in the art, other implementation drawings can be derived from the provided drawings without any creative efforts.

The structure, proportion, and size shown in the drawings of the specification are only used to match the contents disclosed in the specification for those skilled in the art to understand and read, and are not intended to limit the conditions under which the present disclosure can be implemented, having no technically substantive significance. Any modification of structure, change of proportional relationship, or adjustment of size should still fall within the scope of the technical content disclosed in the present disclosure without affecting the efficacy and purpose of the present disclosure.

Figure 1:
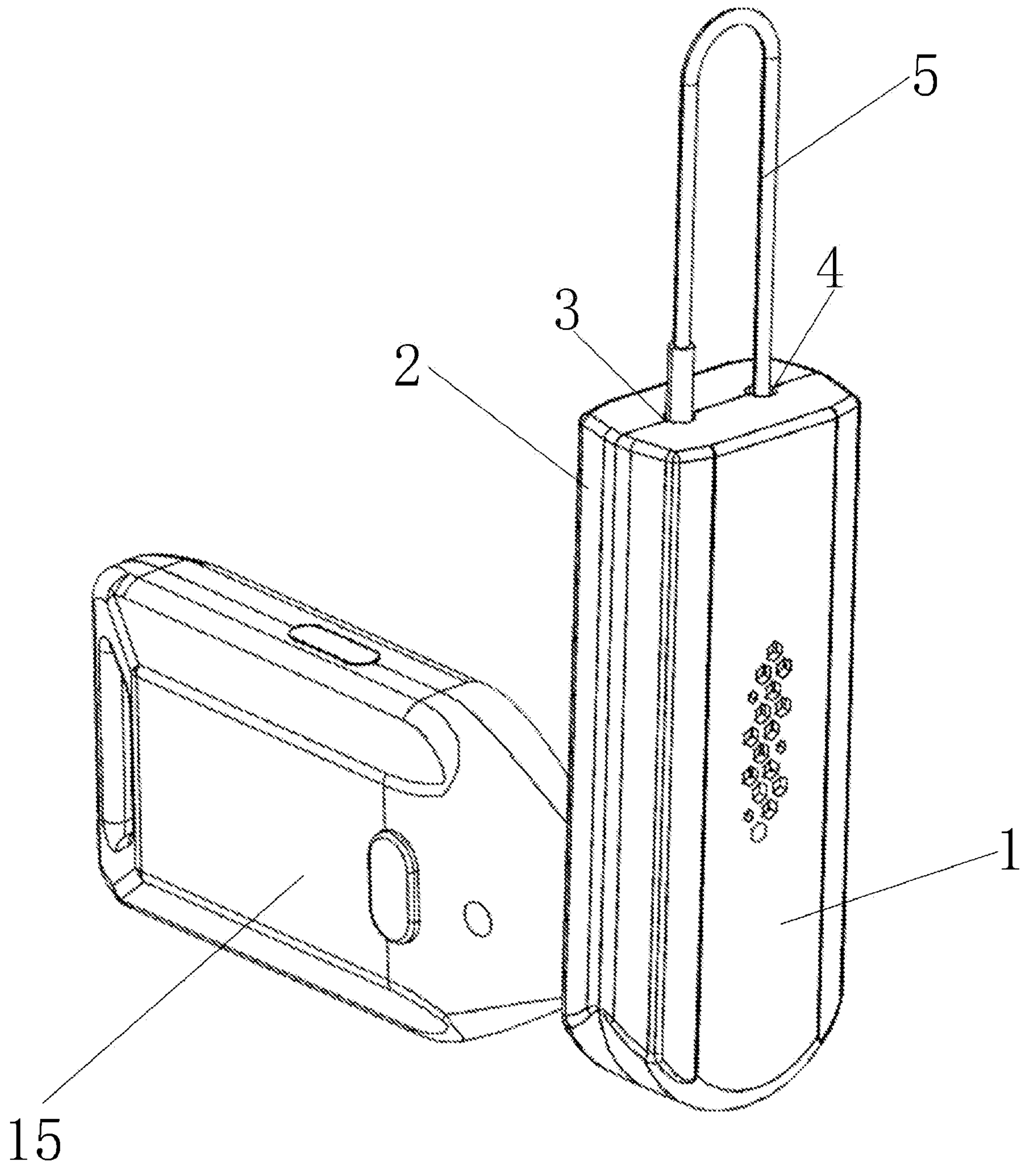
FIG. 1 is a first view of an electronic anti-theft label of a nickel-titanium alloy temperature memory wire according to some embodiments of the present disclosure.

Reference numerals in the drawings are listed as follows:

1 first housing; 2 second housing, 21 boss; 3 first groove; 4 second groove; 5 locking beam, 51 locking groove; 6 lock catch, 61 position-limiting hole; 7 first spring; 8 second spring; 9 rotating member; 10 PCB; 11 buzzer; 12 nickel-titanium alloy temperature memory wire; 13 first coil; 14 third groove; 15 unlocking device; 16 second coil.

DETAILED DESCRIPTION OF THE EMBODIMENTS

The embodiments of the present disclosure are illustrated below by specific examples. Those skilled in the art can readily understand other advantages and effects of the present disclosure from the contents disclosed in this specification. It is apparent that the embodiments described herein are only some rather than all of the embodiments of the present disclosure. Based on the embodiments in the present disclosure, all of other embodiments, made by the person of ordinary skill in the art without any creative efforts, fall into the scope of protection of the present disclosure.

Figure 2:
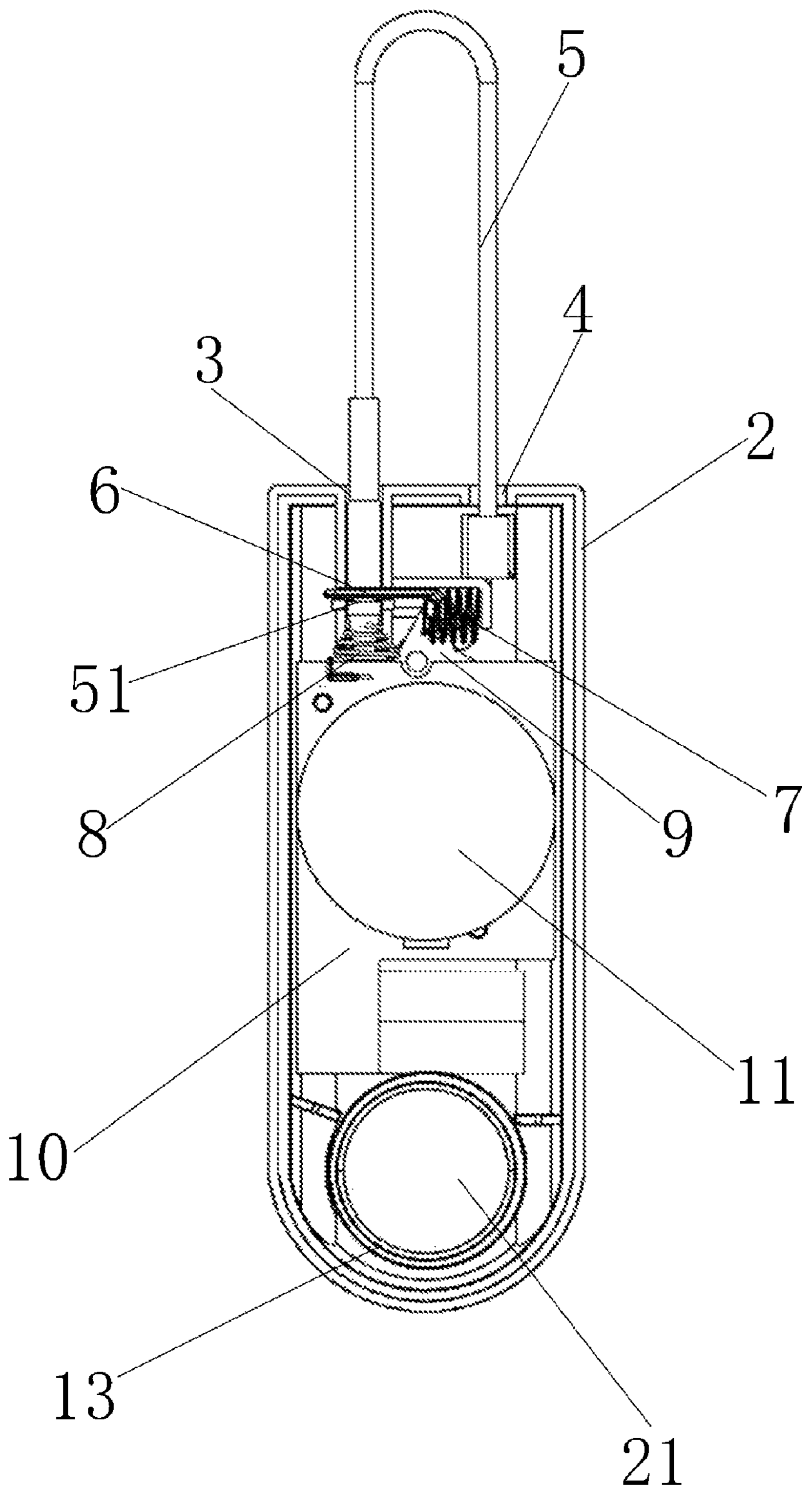
FIG. 2 is a first view showing an internal structure of the electronic anti-theft label of the nickel-titanium alloy temperature memory wire according to some embodiments of the present disclosure.
Figure 3:
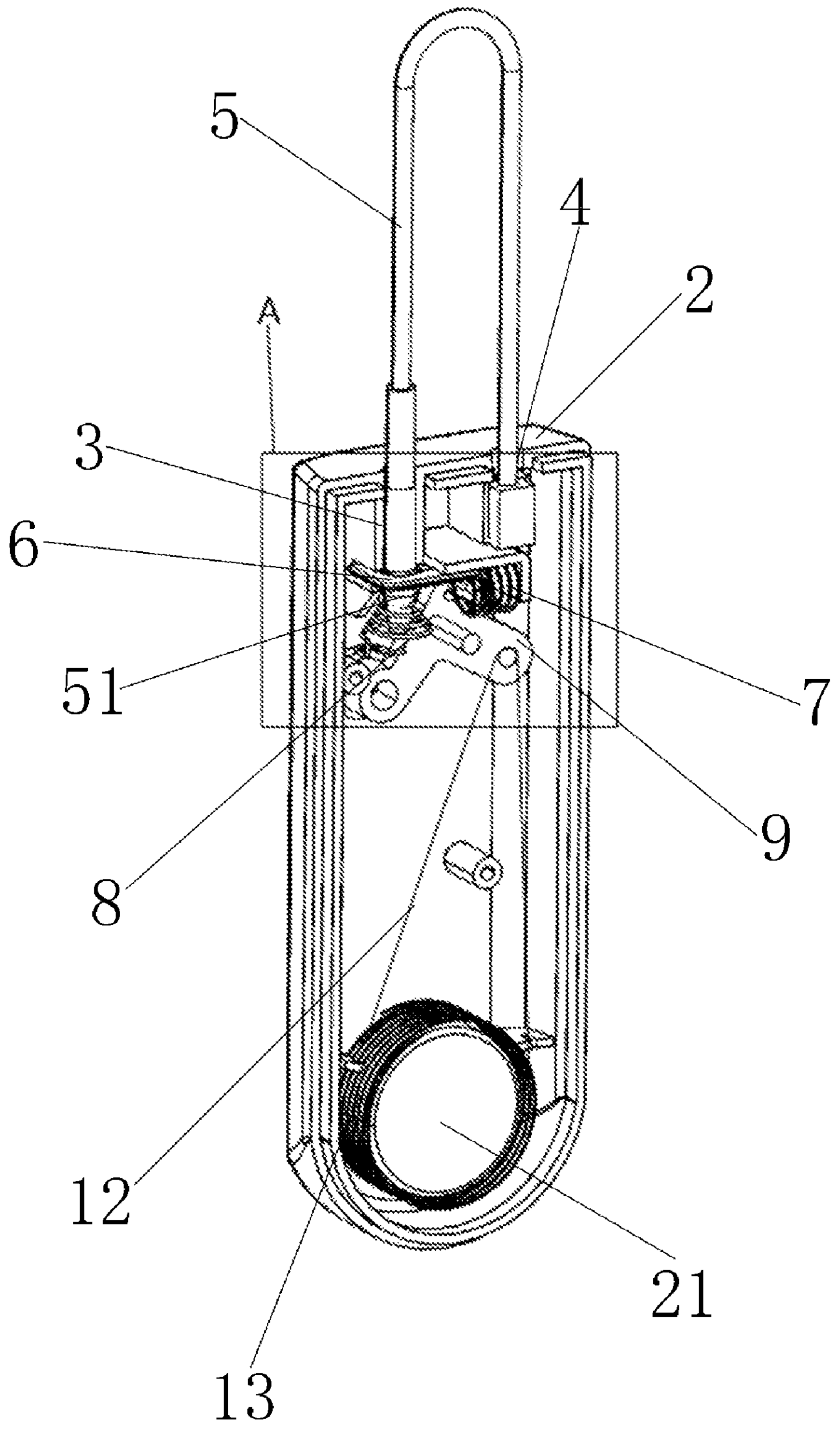
FIG. 3 is a second view showing the internal structure of the electronic anti-theft label of the nickel-titanium alloy temperature memory wire according to some embodiments of the present disclosure.
Figure 4:
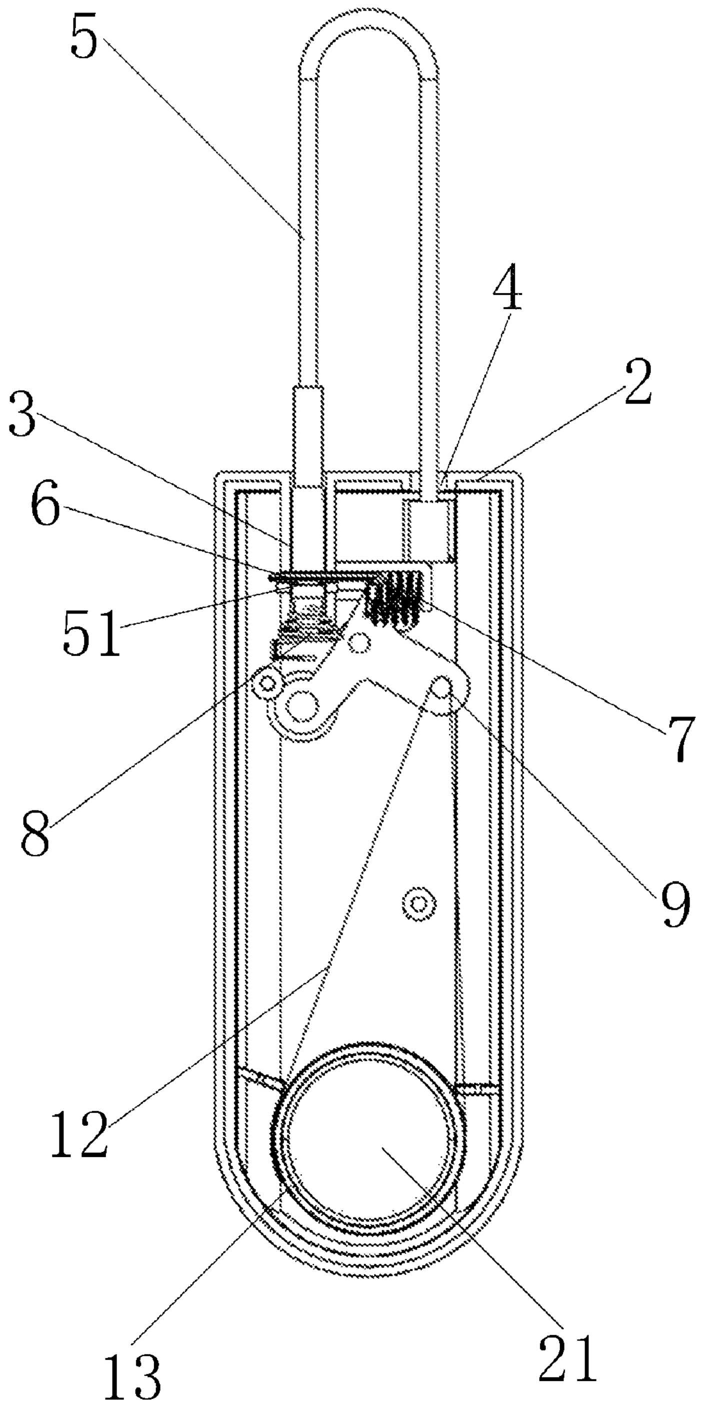
FIG. 4 is a third view showing the internal structure of the electronic anti-theft label of the nickel-titanium alloy temperature memory wire according to some embodiments of the present disclosure.
Figure 5:
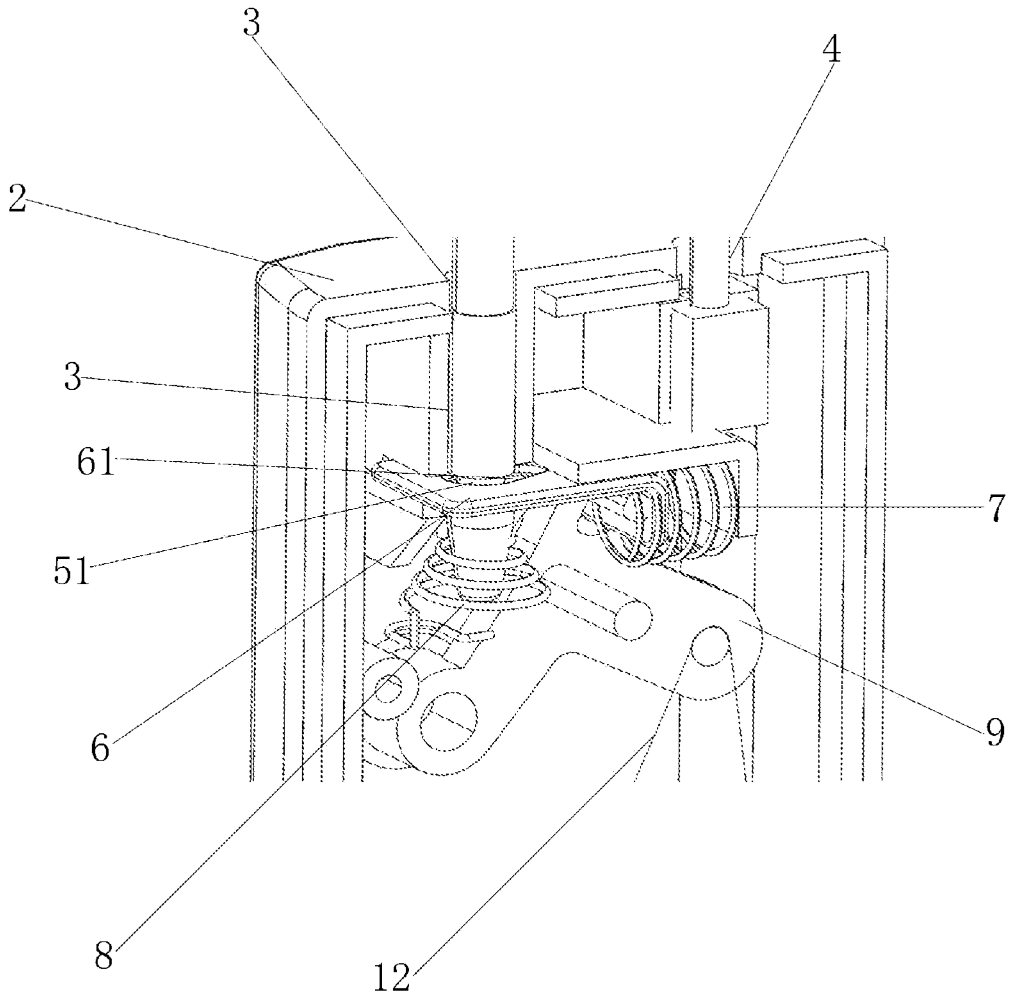
FIG. 5 is an enlarged view of portion A of the electronic anti-theft label of the nickel-titanium alloy temperature memory wire in FIG. 3 according to some embodiments of the present disclosure.
Figure 6:
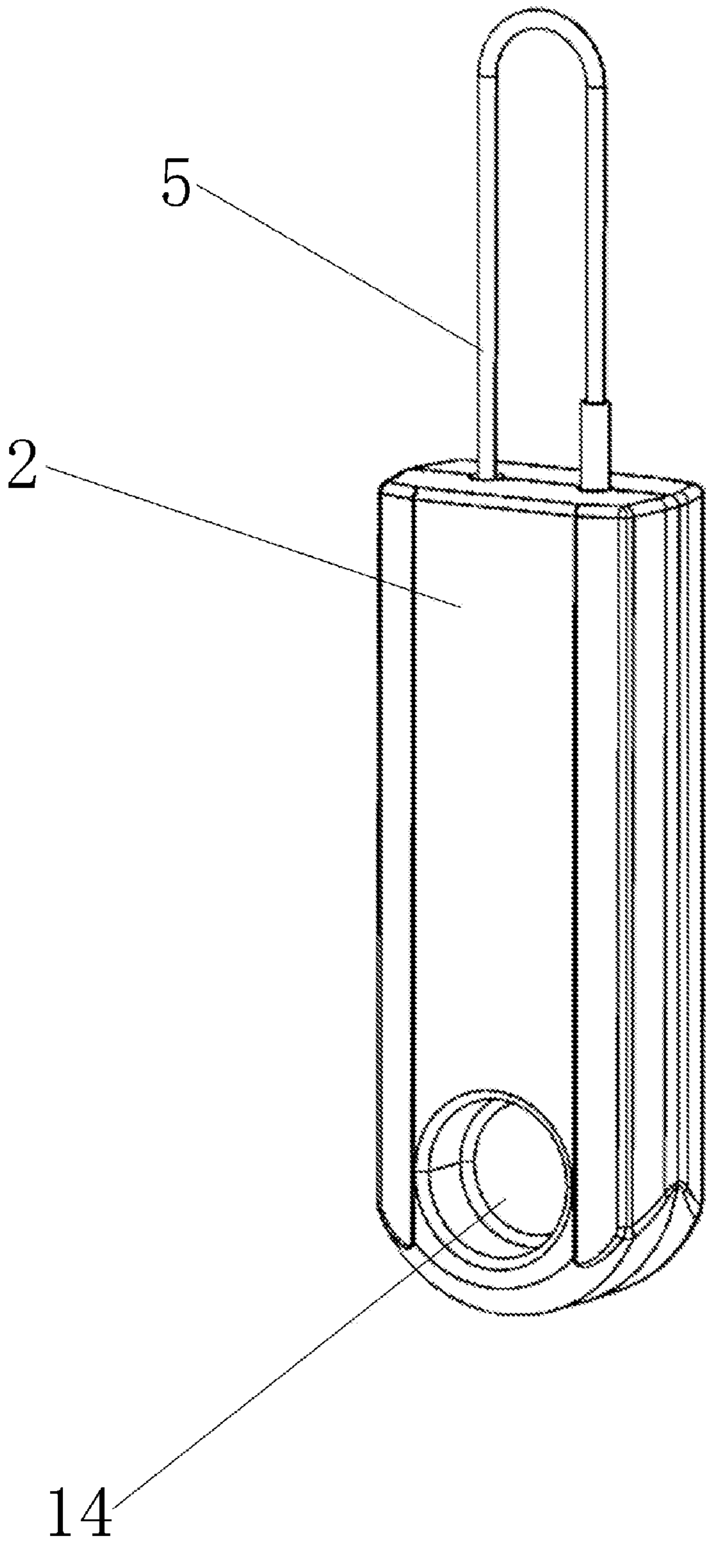
FIG. 6 is a second view of the electronic anti-theft label of the nickel-titanium alloy temperature memory wire according to some embodiments of the present disclosure.
Figure 7:
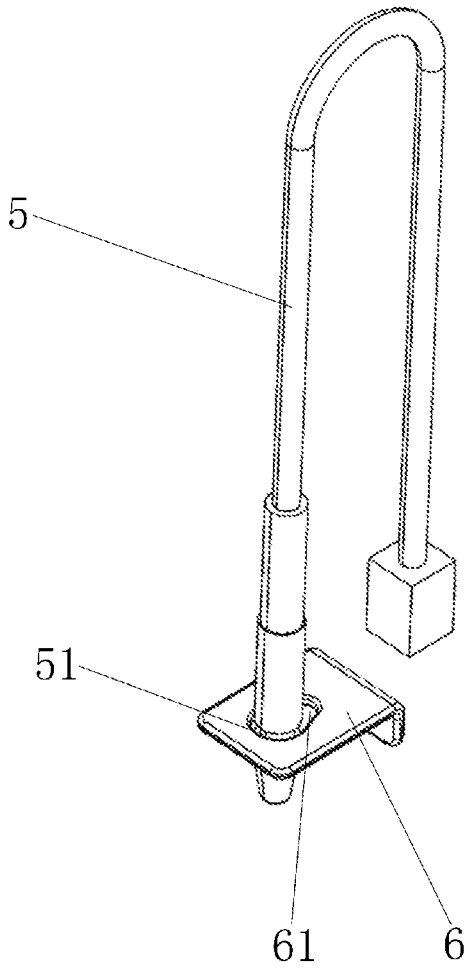
FIG. 7 is a perspective view of a locking beam and a locking catch of the electronic anti-theft label of the nickel-titanium alloy temperature memory wire according to some embodiments of the present disclosure.
Figure 8:
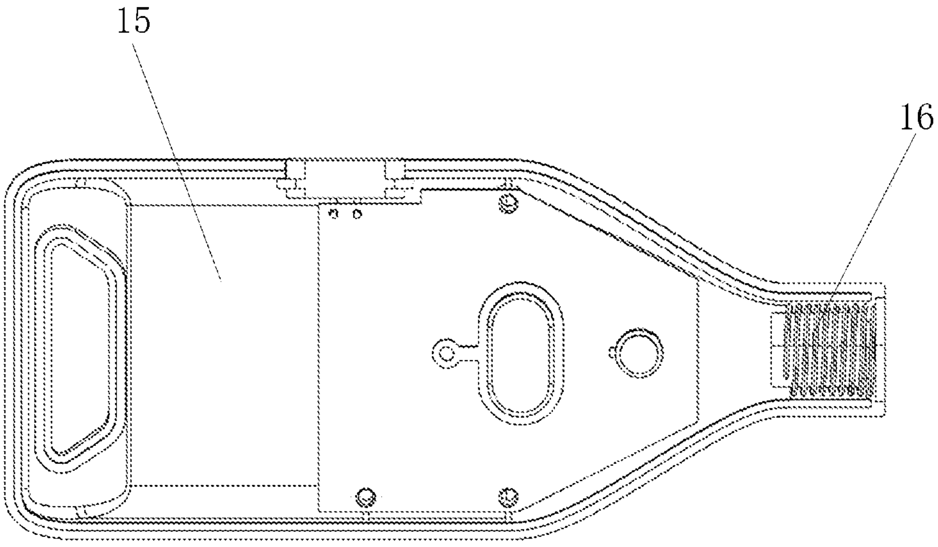
FIG. 8 is a front view of an unlocking device of the electronic anti-theft label of the nickel-titanium alloy temperature memory wire according to some embodiments of the present disclosure.

As shown in FIG. 1 to FIG. 8, an electronic anti-theft label of a nickel-titanium alloy temperature memory wire according to a first aspect of the present disclosure includes a first housing 1, a second housing 2 with a boss 21, a locking beam 5, a locking catch 6, a rotating device, a nickel-titanium alloy temperature memory wire 12, and an unlocking device 15. The nickel-titanium alloy temperature memory wire 12 is made of a special material that combines sensing and driving. The nickel-titanium alloy with shape memory refers to a kind of alloy that restores to its original shape in a certain initial state. The properties of nickel-titanium alloy with shape memory are as follows: the nickel-titanium alloy with shape memory automatically restores to its shape after a certain heat treatment, which has the shape memory function; the nickel-titanium alloy with shape memory is deformed under an external force, and has elasticity; and the nickel-titanium alloy with shape memory has excellent damping property by means of the self-adjustment of phase transformation and the interface and movement generated during phase transformation. The first housing 1 and the second housing 2 generally have integral structures made of plastic. Plastic material has the advantages of lightweight, chemical stability, low manufacturing cost, insulation, low thermal conductivity, and easy shaping, so the whole product is lighter and more convenient to carry.

The first housing 1 is buckled on the second housing 2 to form a hollow chamber for accommodating the rotating device. A first groove 3 and a second groove 4 are defined in the hollow chamber, and the first groove 3 and the second groove 4 are in communication with the hollow chamber. The locking beam 5 is generally U-shaped, and two ends of the locking beam 5 are arranged in the first groove 3 and the second groove 4 respectively. The locking catch 6 is arranged in the hollow chamber and is connected with an end of the locking beam 5 in the first groove 3, and the rotating device is connected with the locking catch 6. The nickel-titanium alloy temperature memory wire 12 is wound on the boss 21 to form a first coil 13 which abuts against the rotating device. An end of the unlocking device 15 is provided with a second coil 16 made of metal, such as copper, iron, and aluminum. A third groove 14 is defined on a side, facing away from the first housing 1, of the boss 21. The third groove 14 is configured to accommodate the second coil 16. The second coil 16 is placed in the third groove 14 after the unlocking device 15 is energized, the first coil 13 is induced to generate electricity, and the nickel-titanium alloy temperature memory wire 12 is heated to contract to drive the rotating device to move, so that the locking catch 6 is disengaged from the locking beam 5. The first coil 13 and the second coil 16 are loop coils. The more turns of the loop coils, the faster the unlocking speed.

A power supply and a power cord are built in the unlocking device 15, and are electrically connected with the second coil 16. When the built-in power supply is used, the current used is direct current. When the power cord is used, the current used is alternating current. Moreover, a transformer configured to transform a voltage on the second coil 16 to a voltage less than 36V which is harmless to the human body is provided in the unlocking device 15. Moreover, a power switch is provided on the unlocking device 15, and the power switch is configured to control the current and the on/off of the second coil 16.

The unlocking principle is as follows: First, the second coil 16 on the unlocking device 15 generates, after being energized, a magnetic field around. The second coil 16 serving as a sending end is placed in the third groove 14, so that the first coil 13 is induced to generate electricity by using the electromagnetic induction principle, and the first coil 13 serves as a receiving end. The sending end sends an electromagnetic signal to the external environment under the action of electric power, and the receiving end receives the electromagnetic signal and converts the electromagnetic signal into current, which is wireless, and relies on electromagnetic wave propagation to convert electromagnetic wave energy into electric energy. Finally, the first coil 13 transmits wirelessly to generate current. When the current passes through the nickel-titanium alloy temperature memory wire 12, the nickel-titanium alloy temperature memory wire 12 is energized and heated to contract to drive the rotating device to move by using the property that the shape of the nickel-titanium alloy changes with the change of the temperature, and restores with the restoring of the temperature, so that the locking catch 6 is disengaged from the locking beam 5, thus achieving the purpose of unlocking.

According to the present disclosure, the electromagnetic induction of the first coil 13 and the second coil 16 and the shape change caused by heating and contraction of the nickel-titanium alloy temperature memory wire 12 after being energized are utilized to drive the rotating device, so as to achieve the purpose of unlocking. Compared with the conventional magnetic anti-theft label, the process of the present disclosure is simpler and lighter, the material cost is reduced, the service life is prolonged and the safety is improved. At the same time, a novel unlocking mode is innovatively proposed.

According to the present disclosure, preferably, the rotating device includes a first spring 7, a second spring 8 and a rotating member 9. The second spring 8 generally is a conical spring which tapers from top to bottom. The rotating member 9 is inverted V-shaped. The rotating member 9 is connected with the locking catch 6. One end of the first spring 7 abuts against an inner wall of the hollow chamber, the other end of the first spring 7 abuts against one end of the rotating member 9, the other end of the rotating member 9 abuts against one end of the second spring 8, and the other end of the second spring 8 abuts against the end of the locking beam 5 in the first groove 3. When unlocking, the first spring 7 is compressed and the second spring 8 springs up.

According to the present disclosure, preferably, the electronic anti-theft label of the nickel-titanium alloy temperature memory wire further includes a PCB 10 and a buzzer 11. The PCB 10 is electrically connected with the nickel-titanium alloy temperature memory wire 12. The buzzer 11 is electrically connected with the PCB 10. The buzzer 11 buzzes to remind a user to unlock when the nickel-titanium alloy temperature memory wire 12 is energized.

According to the present disclosure, preferably, a locking groove 51 is defined at the end of the locking beam 5 in the first groove 3. A position-limiting hole 61 is defined in the locking catch 6. The locking groove 51 is clamped in the position-limiting hole 61. A width of the position-limiting hole 61 gradually decreases from left to right.

Although the present disclosure has been described in detail above with general descriptions and specific embodiments, some modifications or improvements can still be made thereto on the basis of the present disclosure, which are obvious to those skilled in the art. Therefore, these modifications or improvements made without departing from the spirit of the present disclosure fall within the protection scope of the present disclosure.

Terms such as "upper", "lower", "left", "right" and "middle" used in this specification are only for clarification of description, and are not used to limit the applicable scope of the present disclosure. Variants in which the relative relationship is altered or adjusted without substantively changing the technical content shall still be deemed as to fall in the applicable scope of the present disclosure.

What is claimed is:

1. An electronic anti-theft label of a nickel-titanium alloy temperature memory wire, comprising a first housing (1), a second housing (2) with a boss (21), a locking beam (5), a locking catch (6), a rotating device, a nickel-titanium alloy temperature memory wire (12), and an unlocking device (15); wherein a hollow chamber for accommodating the rotating device is defined by the first housing (1) and the second housing (2), a first groove (3) and a second groove (4) are defined in the hollow chamber, the first groove (3) and the second groove (4) are in communication with the hollow chamber; two ends of the locking beam (5) are arranged in the first groove (3) and the second groove (4) respectively; the locking catch (6) is arranged in the hollow chamber and is connected with an end of the locking beam (5) in the first groove (3), and the rotating device is connected with the locking catch (6); the nickel-titanium alloy temperature memory wire (12) is wound on the boss (21) to form a first coil (13) which abuts against the rotating device; an end of the unlocking device (15) is provided with a second coil (16) made of metal, a third groove (14) is defined on a side, facing away from the first housing (1), of the boss (21), the third groove (14) is configured to accommodate the second coil (16), the second coil (16) is placed in the third groove (14) after the unlocking device (15) is energized, the first coil (13) is induced to generate electricity, and the nickel-titanium alloy temperature memory wire (12) is heated to contract to drive the rotating device to move, so that the locking catch (6) is disengaged from the locking beam (5).

2. The electronic anti-theft label of the nickel-titanium alloy temperature memory wire according to claim 1, wherein the rotating device comprises a first spring (7), a second spring (8) and a rotating member (9), the rotating member (9) is connected with the locking catch (6), one end of the first spring (7) abuts against an inner wall of the hollow chamber, the other end of the first spring (7) abuts against one end of the rotating member (9), the other end of the rotating member (9) abuts against one end of the second spring (8), and the other end of the second spring (8) abuts against the end of the locking beam (5) in the first groove (3).

3. The electronic anti-theft label of the nickel-titanium alloy temperature memory wire according to claim 2, wherein the second spring (8) is a conical spring which tapers from top to bottom.

4. The electronic anti-theft label of the nickel-titanium alloy temperature memory wire according to claim 1, further comprising a PCB (10) and a buzzer (11), wherein the PCB (10) is electrically connected with the nickel-titanium alloy temperature memory wire (12), the buzzer (11) is electrically connected with the PCB (10), and the buzzer (11) buzzes when the nickel-titanium alloy temperature memory wire (12) is energized.

5. The electronic anti-theft label of the nickel-titanium alloy temperature memory wire according to claim 1, wherein the locking beam (5) is U-shaped.

6. The electronic anti-theft label of the nickel-titanium alloy temperature memory wire according to claim 2, wherein the rotating member (9) is inverted V-shaped.

7. The electronic anti-theft label of the nickel-titanium alloy temperature memory wire according to claim 1, wherein a locking groove (51) is defined at the end of the locking beam (5) in the first groove (3), a position-limiting hole (61) is defined in the locking catch (6), and the locking groove (51) is clamped in the position-limiting hole (61).

8. The electronic anti-theft label of the nickel-titanium alloy temperature memory wire according to claim 7, wherein a width of the position-limiting hole (61) gradually decreases from left to right.

* * * * *